(12) United States Patent
Ciraula et al.

(10) Patent No.: US 8,533,396 B2
(45) Date of Patent: Sep. 10, 2013

(54) MEMORY ELEMENTS FOR PERFORMING AN ALLOCATION OPERATION AND RELATED METHODS

(75) Inventors: Michael Ciraula, Ft. Collins, CO (US); Carson Henrion, Ft. Collins, CO (US); Ryan Freese, Ft. Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 277 days.

(21) Appl. No.: 12/950,826

(22) Filed: Nov. 19, 2010

(65) Prior Publication Data

US 2012/0131279 A1     May 24, 2012

(51) Int. Cl.
*G06F 12/00*     (2006.01)

(52) U.S. Cl.
USPC .......................................... 711/128; 711/133

(58) Field of Classification Search
None
See application file for complete search history.

(56) References Cited

U.S. PATENT DOCUMENTS

| | | | |
|---|---|---|---|
| 7,240,157 B2 | 7/2007 | Frank et al. | |
| 2001/0011328 A1* | 8/2001 | Chung | 711/128 |
| 2002/0156962 A1* | 10/2002 | Chopra et al. | 711/3 |
| 2010/0030966 A1* | 2/2010 | Hirao et al. | 711/122 |
| 2010/0070714 A1* | 3/2010 | Hoover et al. | 711/128 |
| 2010/0088473 A1* | 4/2010 | Kobayashi | 711/143 |

* cited by examiner

*Primary Examiner* — Than Nguyen
(74) *Attorney, Agent, or Firm* — Mahamedi Paradice Kreisman LLP

(57) ABSTRACT

Apparatus for memory elements and related methods for performing an allocate operation are provided. An exemplary memory element includes a plurality of way memory elements and a replacement module coupled to the plurality of way memory elements. Each way memory element is configured to selectively output data bits maintained at an input address. The replacement module is configured to enable output of the data bits maintained at the input address of a way memory element of the plurality of way memory elements for replacement in response to an allocate instruction including the input address.

19 Claims, 4 Drawing Sheets

MEMORY ELEMENTS FOR PERFORMING AN ALLOCATION OPERATION AND RELATED METHODS

TECHNICAL FIELD

Embodiments of the subject matter described herein relate generally to electronic circuits, and more particularly, embodiments of the subject matter relate to memory elements for use in computing devices.

BACKGROUND

Memory elements are widely used in computing applications. For example, a typical computing device may include a combination of volatile and non-volatile memory elements to maintain data, program instructions, and the like that are accessed by a processing unit (e.g., a CPU) during operation of the computing device. Memory accesses typically are associated with latencies, which impair performance of the computing device. Accordingly, a processing unit typically includes one or more memory elements, known as caches, to provide requested data or instructions to the processing unit with reduced latency. Typically, in the event of a miss in one cache, the cache in the next higher level of the hierarchy is checked for the desired data before accessing external memory. If the desired data is not found in the next higher level of cache, it is desirable to allocate space in that cache for that data that must be fetched from external memory in an expeditious and efficient manner.

BRIEF SUMMARY OF EMBODIMENTS

In general, an apparatus for a memory element is provided. The memory element includes a plurality of way memory elements and replacement module coupled to the plurality of way memory elements. Each way memory element is configured to selectively output data bits maintained at an input address. The replacement module is configured to enable output of the data bits maintained at the input address of a way memory element of the plurality of way memory elements, wherein the entry at the input address of the enabled way memory element is to be replaced.

In one embodiment, an apparatus for a computing module is provided. The computing module includes a memory controller configured to provide an allocate instruction including an input address and a cache memory element coupled to the memory controller. The cache memory element includes a first memory block configured to maintain data, and a second memory block including a plurality of way memory elements. Each way memory element is configured to maintain tag information corresponding to the data maintained by the first memory block, wherein each way memory element is configured to selectively output the tag information maintained at the input address in response to the allocate instruction. A replacement module is configured to enable output of the tag information from a first way memory element of the plurality of way memory elements.

In another embodiment, a method is provided for operating a memory element that includes a plurality of way memory elements. The method comprises receiving an allocate instruction including an input address, and in response to the allocate instruction, enabling a read output of a first way memory element of the plurality of way memory elements. The read output corresponds to information maintained at the input address by the first way memory element, wherein the input address of the first way memory element is to be replaced for that input address.

In yet another embodiment, a computer-readable medium having computer-executable instructions or data stored thereon is provided. When executed, the computer-executable instructions or data facilitate fabrication of a memory element comprising a plurality of way memory elements and a replacement module coupled to the plurality of way memory elements. Each way memory element is configured to selectively output data bits maintained at an input address, wherein the replacement module is configured to enable output of the data bits maintained at the input address of a first way memory element of the plurality of way memory elements to be replaced for that input address.

This summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Technologies and concepts discussed herein relate to cache memory elements for use in computing modules and related methods for performing an allocate operation. As described in greater detail below, an allocate operation is a hybrid operation representing a combination of a lookup operation and a read operation performed concurrently. In this regard, when the lookup operation results in a cache hit for input tag information at an input address, the output of the lookup operation (e.g., a hit signal and matching tag information) is provided (e.g., to a memory controller or northbridge). When the lookup operation results in a cache miss, the output of the read operation is provided. As described in greater detail below, the output of the read operation corresponds to the tag information maintained at that input address in the way that is to be replaced based on that input address. In an exemplary embodiment, the output of the read operation is selectively enabled or otherwise provided from within the least recently used way for that input address and disabled within the other ways, such that the number (and distance) of signal paths, lines, or routes that toggle in response to the read operation are minimized. Additionally, the least recently used way is identified and its output enabled within the same clock cycle during which the lookup operation is completed.

Figure 1:
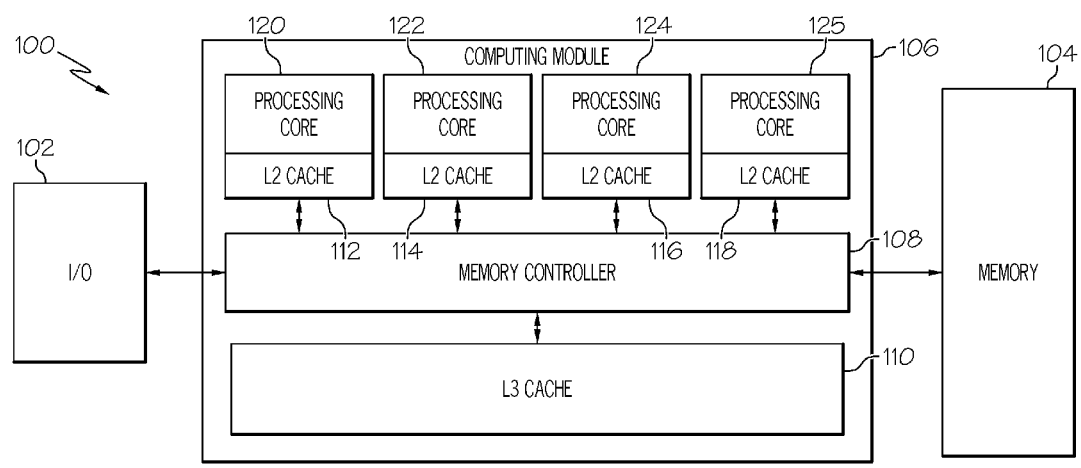
FIG. 1 is a block diagram of a computing system in accordance with one embodiment.

FIG. 1 depicts an exemplary embodiment of a computing system 100. The computing system 100 includes, without limitation, one or more input/output (I/O) peripherals 102, memory 104, and a computing module 106, such as a processor, central processing unit (CPU), graphics processing unit (GPU), or the like. In an exemplary embodiment, the computing module 106 includes a memory controller 108 (or northbridge) configured to interface with the I/O peripherals 102 and the memory 104, a plurality of cache memory elements (or caches) 110, 112, 114, 116, 118, and a plurality of processing cores 120, 122, 124, 126. It should be understood that FIG. 1 is a simplified representation of a computing system 100 for purposes of explanation and ease of description, and FIG. 1 is not intended to limit the subject matter in any way. Practical embodiments of the computing system 100 may include other devices and components for providing additional functions and features, and/or the computing system 100 may be part of a larger system, as will be understood.

The I/O peripherals 102 generally represent the hardware, software, and/or firmware components configured to support communications to/from the computing module 106 and one or more peripheral (or external) devices. For example, the I/O peripheral 102 may be realized as a bus or another communications interface configured to support data transmission to/from the computing module 106 in accordance with one or more data communication protocols.

The memory 104 generally represents the main memory or primary memory for the computing system 100. Depending on the embodiment, memory 104 may be realized as a hard disk, flash memory, ROM memory, RAM memory, another suitable storage medium known in the art or any suitable combination thereof. The memory 104 is preferably non-volatile and maintains data and/or program instructions to support operations of the computing system 100 and/or computing module 106 as will be appreciated in the art. In an exemplary embodiment, memory 104 is implemented separately from computing module 106 (e.g., on another chip and/or die) may be understood as being external to computing module 106.

In an exemplary embodiment, the computing module 106 includes a memory controller 108 that is coupled to the I/O peripherals 102 and the external memory 104 and controls communications between the components of computing module 106 and the I/O peripherals 102 and/or external memory 104. The processing cores 120, 122, 124, 126 generally represent the main processing hardware, logic and/or circuitry for the computing module 106, and each processing core 120, 122, 124, 126 may be realized using one or more arithmetic logic units (ALUs), one or more floating point units (FPUs), one or more memory elements (e.g., one or more caches), discrete gate or transistor logic, discrete hardware components, or any combination thereof. Although not illustrated in FIG. 1, each processing core 120, 122, 124, 126 may implement its own associated cache memory element (e.g., a level one or L1 cache) in proximity to its respective processing circuitry for reduced latency. The caches 110, 112, 114, 116, 118 are realized as intermediary memory elements having reduced size relative to external memory 104 for temporarily storing data and/or instructions retrieved from external memory 104. In the illustrated embodiment, the computing module 106 includes a set of caches 112, 114, 116, 118 that are in close proximity to and coupled between a respective processing core 120, 122, 124, 126 and the memory controller 108. In this regard, caches 112, 114, 116, 118 may be referred to as core-coupled caches, and each core-coupled cache 112, 114, 116, 118 maintains data and/or program instructions previously fetched from external memory 104 that were either previously used by and/or likely to be used by its associated processing core 120, 122, 124, 126. The caches 112, 114, 116, 118 are preferably larger than the L1 caches implemented by the processing cores 120, 122, 124, 126 and function as level two caches (or L2 caches) in the memory hierarchy. The illustrated embodiment of computing module 106 also includes another higher level cache 110 (a level three or L3 cache) that is preferably larger than the L2 caches 112, 114, 116, 118.

Figure 2:
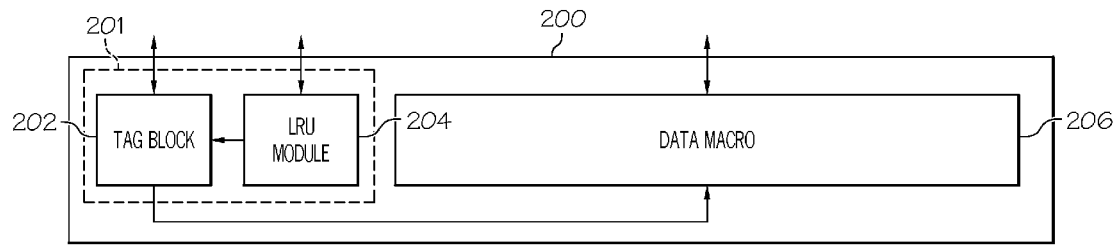
FIG. 2 is a block diagram of a cache memory element suitable for use in the system of FIG. 1 in accordance with one embodiment.

FIG. 2 depicts an exemplary embodiment of a cache memory element 200 suitable for use in the computing system 100 of FIG. 1. In an exemplary embodiment, the L3 cache 110 is realized as cache memory element 200. The illustrated embodiment of the cache memory element 200 includes data management circuitry 201 and a data memory block (or data macro) 206. In an exemplary embodiment, the data management circuitry 201 includes a tag memory block (or tag bank) 202 and a replacement module 204. The data macro 206 generally represents the logical grouping of circuitry and/or hardware components configured to maintain data and/or instructions previously requested or utilized by one or more of the processing cores 120, 122, 124, 126 that has been fetched from external memory 104 provided to the cache 200 (e.g., from L2 caches 112, 114, 116, 118 and/or external memory 104) by the memory controller 108.

The tag block 202 generally represents the logical grouping of hardware and/or circuitry configured to maintain tag information (e.g., a data identifier, status information, mapping information, indexing bits, error correction bits, and the like) associated with an individual portion or segment of data maintained by data macro 206. In an exemplary embodiment, the tag block 202 includes a plurality of tag memory elements (or tag macros), wherein each tag macro generally represents a subset of the hardware, circuitry and/or logic of the tag block 202. As described in greater detail below in the context of FIG. 3, in an exemplary embodiment, each tag macro of the tag block 202 includes a plurality of way memory elements (or ways) coupled to control circuitry, wherein each way generally represents the hardware, circuitry and/or logic configured to store or otherwise maintain the tag information of the tag block 202 and the control circuitry represents the circuitry, logic, and/or hardware components of the tag macro that control the output data bits provided from the respective tag macro, as described in greater detail below. In this regard, the cache memory element 200 comprises a set associative cache, wherein each way corresponds to a subset of the cache memory element 200 where tag information corresponding to an input address may be stored or otherwise located.

The replacement module 204 generally represents the circuitry, logic, memory elements and/or hardware components (or a combination thereof) of the data management circuitry 201 that is configured to implement one or more algorithms to determine which way of the plurality of ways within the tag block 202 has an entry at an input address provided by the memory controller 108 should be replaced based on that input address. As described in greater detail below, in an exemplary embodiment, in response to an allocate instruction from the memory controller 108, the replacement module 204 is configured to assert or otherwise generate a way selection signal to enable, activate, or otherwise select the read output of a way of the plurality of ways having the entry at the input address to be replaced for provision from the tag block 202 and/or cache 110, 200 to the memory controller 108 in the event of a cache miss for the lookup operation.

In an exemplary embodiment, the replacement module 204 is realized as a least recently used (LRU) module configured to implement one or more algorithms to determine the least recently used way of the plurality of ways within the tag block 202 for an input address provided by the memory controller 108, that is, the way of the plurality of ways having an entry at the input address that is the least recently used (or accessed) entry for that input address among all of the ways within the tag block 202. It should be appreciated that although the subject matter is described herein in the context of a LRU module that determines or otherwise identifies the least recently used way memory element, in practice, the subject matter may be implemented in an equivalent manner using other replacement policies and/or schemes, and as such, the subject matter is not intended to be limited to any particular replacement policy and/or scheme. For example, in alternative embodiments, the replacement module 204 may be realized as a least frequently used (LFU) module configured to determine which way of the plurality of ways is least frequently used (or accessed) for the input address. Accordingly, for convenience, but without limitation, the replacement module 204 is alternatively referred to herein as the LRU module. As described in greater detail below, in an exemplary embodiment, in response to an allocate instruction from the memory controller 108, the LRU module 204 asserts or otherwise generates a way selection signal to enable, activate, or otherwise select the read output of a least recently used way of the plurality of ways in the event of a cache miss for the lookup operation.

Figure 3:
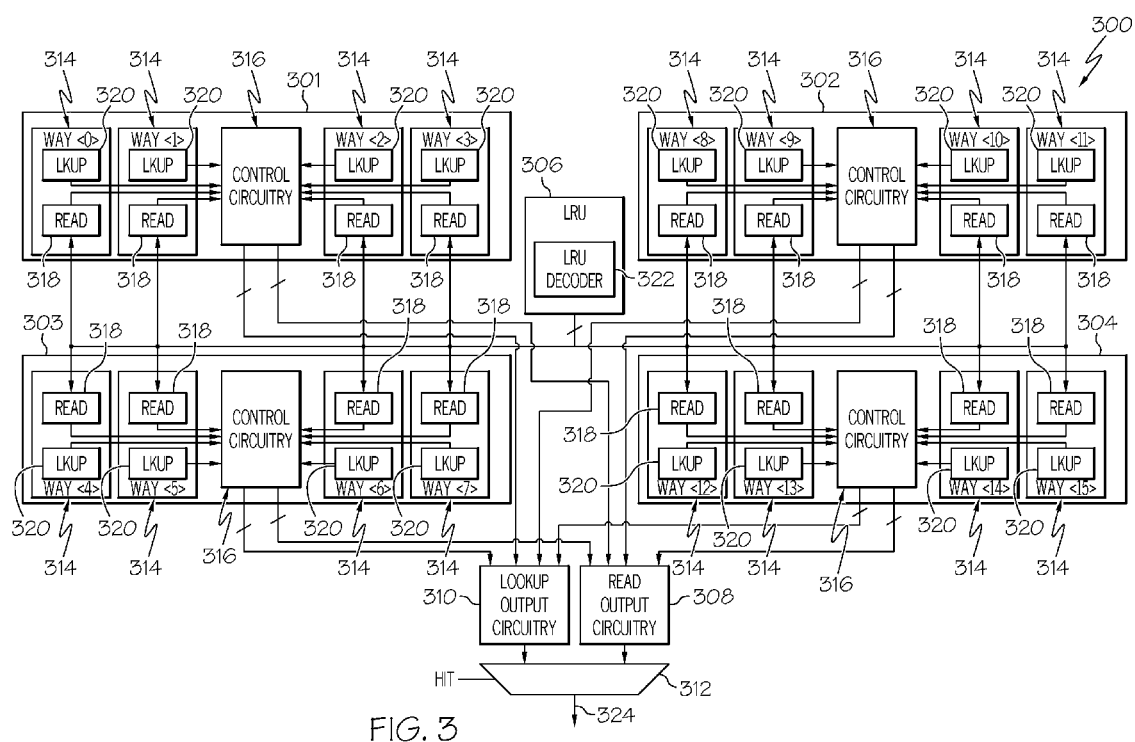
FIG. 3 is a block diagram of data management circuitry suitable for use in the cache memory element of FIG. 2 in accordance with one embodiment.

FIG. 3 depicts an exemplary embodiment of data management circuitry 300 including, without limitation, a plurality of tag macros 301, 302, 303, 304, LRU module 306, read output circuitry 308, lookup output circuitry 310, and output selection circuitry 312. Referring again to FIG. 2, in an exemplary embodiment, the data management circuitry 201 in the cache 200 is realized as data management circuitry 300. In this regard, the tag block 202 comprises the plurality of tag macros 301, 302, 303, 304 and the replacement module 204 comprises LRU module 306. It should be understood that FIG. 3 is a simplified representation of the data management circuitry 300 for purposes of explanation and ease of description, and FIG. 3 is not intended to limit the subject matter in any way. Practical embodiments of the data management circuitry 300 may include other devices and components for providing additional functions and features, as will be understood.

As set forth above, in an exemplary embodiment, each tag macro 301, 302, 303, 304 includes a plurality of ways 314 and control circuitry 316. Each way 314 is realized as an array of two-dimensional arrays of memory cells, such as static random access memory (SRAM) cells, that maintain tag information for a subset of the data maintained in the data macro 206. In this regard, each way 314 includes a plurality of arrays of memory cells that are indexed using the input address information provided by memory controller 108 that identifies the desired rows and columns of the way 314 to be accessed in connection with a particular operation. Although not illustrated, it will be appreciated that each way 314 includes circuitry, logic, and/or hardware components (e.g., word line decoders, column selection circuitry, sense amplifiers and the like) configured to read, access, or otherwise provide the individual data bits corresponding to tag information maintained by the respective way 314 at an input address to the inputs of the read circuitry 318 and lookup circuitry 320 in response to a read instruction, a lookup instruction, or an allocate instruction.

In an exemplary embodiment, each way 314 includes read circuitry 318 and lookup circuitry 320 that receive as inputs, the output of an indexed address within the way 314, that is, the data bits corresponding to the tag information maintained by the way 314 at the rows and columns identified by the input address. The read circuitry 318 generally represents the circuitry, logic and/or hardware components of the way 314 that selectively provides the read output of an indexed address within the way 314 (i.e., the data bits corresponding to the tag information maintained at the input address) to the control circuitry 316 of the respective tag macro 301, 302, 303, 304. As described in greater detail below, in an exemplary embodiment, the read output data bits from the read circuitry 318 is normally disabled, wherein in response to an allocate instruction from the memory controller 108, the LRU module 306 enables, activates, or otherwise selects the read output of the read circuitry 318 of a least recently used way 314 for provision to the control circuitry 316 of its respective tag macro 301, 302, 303, 304 while maintaining the read output of the other ways 314 disabled.

The lookup circuitry 320 represents the circuitry, logic and/or hardware components of the way 314 that compares the data bits corresponding to the tag information maintained at the input address within the way 314 to input tag information provided by the memory controller 108 in connection with an allocate instruction. In response to identifying that the tag information at the input address of the way 314 matches (or hits) the input tag information provided by the memory controller 108, the lookup circuitry 320 provides the tag information at the indexed entry of the way 314 to the control circuitry 316 of its respective tag macro 301, 302, 303, 304 and provides a logical high value for a hit signal, thereby indicating a match (or cache hit) for the input tag information to the control circuitry 316 and/or output selection circuitry 312.

The control circuitry 316 generally represents the circuitry, logic and/or hardware components of the way 314 that synchronizes and provides the read output from the read circuitry 318 and the lookup output from lookup circuitry 320 for an indexed entry of a particular way 314 to the read output circuitry 308 and the lookup output circuitry 310, respectively. In an exemplary embodiment, the control circuitry 316 includes read control circuitry configured to perform a bitwise logical OR operation (or bitwise-OR) of the read output bits from the read circuitry 318 of the ways 314 of its tag macro 301, 302, 303, 304 and provide the synchronized result to the input of the read output circuitry 308, as described in greater detail below in the context of FIG. 4. In a similar manner, the control circuitry 316 may perform a bitwise-OR of the lookup output bits from the lookup circuitry 320 of the ways 314 of its tag macro 301, 302, 303, 304 and provide the result to the input of the lookup output circuitry 310. The read output circuitry 308 represents the circuitry, logic and/or hardware components of the data management circuitry 300 that performs a bitwise-OR on the read outputs from the control circuitry 316 of the tag macros 301, 302, 303, 304 to obtain the read output for the data management circuitry 300, and the read output circuitry 308 provides the resulting read output data bits to an input of the output selection circuitry 312. Similarly, the lookup output circuitry 310 represents the circuitry, logic and/or hardware components of the data management circuitry 300 that performs a bitwise-OR operation on the lookup outputs from the control circuitry 316 of the tag macros 301, 302, 303, 304 to obtain the lookup output for the data management circuitry 300, and the lookup output circuitry 310 provides the resulting lookup output data bits to an input of the output selection circuitry 312. In this regard, in an exemplary embodiment, the memory controller 108 manages the contents of the tag block 202 and/or data macro 206 to ensure that the output of the lookup operation will result in a hit in only one way 314.

In accordance with one embodiment, the output selection circuitry 312 is coupled between an output interface 324 of the data management circuitry 300 coupled to the memory controller 108 and the output circuitry 308, 310, wherein the output selection circuitry is configured to select between the lookup output from lookup output circuitry 310 and the read output from read output circuitry 308 for provision to the output interface 324. In accordance with one embodiment, the output selection circuitry 312 is realized as a two-to-one multiplexer. In this regard, in response to a match or hit for the input tag information provided by the memory controller 108 within one of the ways 314 of the data management circuitry 300 and/or tag macros 301, 302, 303, 304, the logical high hit signal generated by the way 314 having the matching tag information (e.g., the matching way) may be utilized to operate the output selection circuitry 312 to select the lookup output from the lookup output circuitry 310 and provide the lookup output data bits to the output interface 314. In this manner, the matching tag information from the matching way 314 is provided to the memory controller 108 along with the logical high hit signal to indicate a cache hit to the memory controller 108. However, if a hit does not occur (e.g., the tag information at the input address of each of the ways 314 fails to match the input tag information), the logical low hit signal indicative of a cache miss may operate the output selection circuitry 312 to select the read output from the read output circuitry 308 and provide the read output data bits to the output interface 324. In this manner, the tag information maintained at the input address in the least recently used way 314 is provided to the memory controller 108. In response to receiving the read output in the absence of a logical high hit signal in response to the allocate instruction, the memory controller 108 indicates, to the respective processing core 120, 122, 124, 126 requesting the data corresponding to the input address and input tag information, that the requested data does not reside in the cache memory element 110, 200, in which case, the memory controller 108 and/or requesting processing core 120, 122, 124, 126 may look for the requested data in the next higher level of the memory hierarchy (e.g., memory 104).

In an exemplary embodiment, the LRU module 306 includes an LRU decoder 322 configured to generate way select signals to enable, activate, or otherwise select the output of an individual way 314 within a particular tag macro 301, 302, 303, 304 of the data management circuitry 300. As described in greater detail below, in an exemplary embodiment, in response to an allocate instruction from the memory controller 108, the LRU decoder 322 identifies or otherwise determines the least recently used way 314 of the data management circuitry 300 for the input address (e.g., set of rows and columns) provided by the memory controller 108 in connection with the allocate instruction. The LRU decoder 322 generates or otherwise provides a logical high way select signal to enable, activate, or otherwise select the read output of the read circuitry 318 associated with the least recently used way 314. In this manner, the LRU decoder 322 enables or otherwise allows the tag information (or data bits) maintained at the input address by the least recently used way 314 to be provided to the read output circuitry 308 via control circuitry 316. In an exemplary embodiment, the LRU decoder 322 generates a one-hot multi-bit way select signal that enables the output of the read circuitry 318 for the least recently used way 314 for the input address while effectively disabling the output of the read circuitry 318 for the remaining ways 314 of the data management circuitry 300. For example, for the illustrated embodiment, the way select signal is a one-hot 16-bit signal, wherein each bit line of the 16-bits is routed to the read circuitry 318 of a respective way 314 such that a logical high signal on the bit line corresponding to the least recently used way 314 enables the output of the read circuitry 318 of the least recently used way 314 while the logical low signals on the remaining bit lines effectively disable the read circuitry 318 of the remaining ways 314. In an exemplary embodiment, the LRU decoder 322, control circuitry 316, and read output circuitry 308 are cooperatively configured to identify the least recently used way 314 and provide the tag information at the input address within the least recently used way 314 as the output of the read operation (i.e., the read output) to the output selection circuitry 312 in the same clock cycle that the output of the lookup operation is provided to the output selection circuitry 312.

Figure 4:
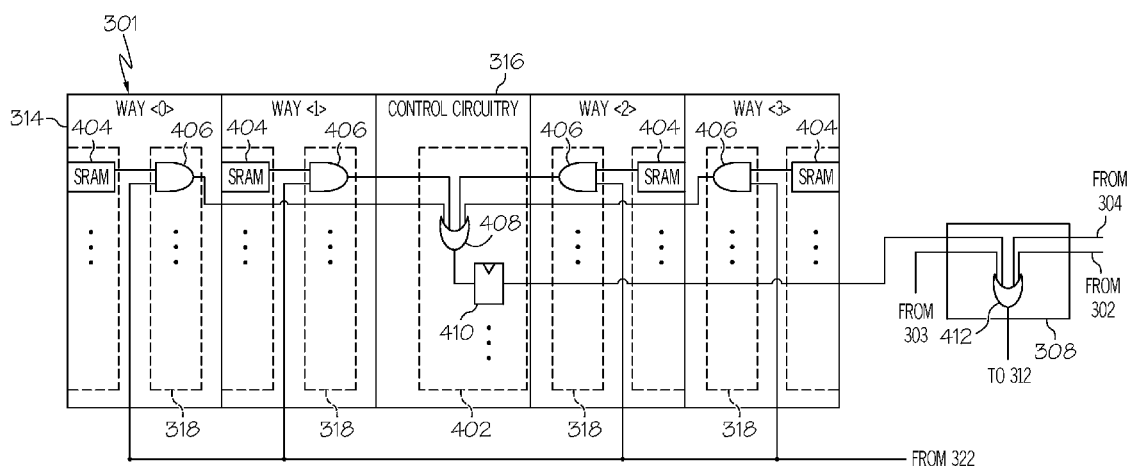
FIG. 4 is a schematic view of an array of a tag macro and read output circuitry suitable for use in the data management circuitry of FIG. 3 in accordance with one embodiment.

FIG. 4 depicts an exemplary embodiment of the read output circuitry 308 along with the read circuitry 318 and the read control circuitry 402 of the control circuitry 316 of a first tag 301 of the data management circuitry 300. It should be understood that FIG. 4 is a simplified representation for purposes of explanation and ease of description, and FIG. 4 is not intended to limit the subject matter in any way. In this regard, although FIG. 4 depicts components for reading a single bit of tag information from a way, the components may be repeated or otherwise replicated for all of the bits of the way, as will be appreciated in the art.

As set forth above, in an exemplary embodiment, each way 314 includes a plurality of arrays of memory cells 404 that are addressed and/or accessed based on the input address information (e.g., rows and columns) provided by the memory controller 108. In the illustrated embodiment, the read circuitry 318 includes a plurality of logical AND gates 406, with each AND gate 406 having a first input coupled to the output of a corresponding array of memory cells 404 and a second input coupled to the LRU decoder 322 or otherwise configured to receive the way select signal bit line for its respective way 314. For example, as illustrated, a bit of tag information from an indexed row and column of an SRAM array 404 may be provided as a first input to an AND gate 406 of the read circuitry 318, and the second input of the AND gate 406 is coupled to the way select signal for the respective way 314. In this manner, in the absence of a logical high way select signal for the respective way 314, the output of the read circuitry 318 (or AND gates 406) of that respective way 314 is maintained at a logic '0' across all of the output bits from the read circuitry 318.

As illustrated, in an exemplary embodiment, the control circuitry 316 includes read control circuitry 402 comprising a plurality of logical OR gates 408, wherein each OR gate 408 has its inputs coupled to a corresponding array of memory cells 404 of each way 314 of the tag macro 301. For example, as illustrated, each input of a first OR gate 406 may be coupled to the output of an AND gate 406 coupled to a first SRAM array 404 of each way 314 of the tag macro 301. The output of the OR gates 408 are provided to the input of corresponding latching arrangements 410 (or flip-flop) to synchronize the output of the read operation with the output of the lookup operation. In the illustrated embodiment, the read output circuitry 308 is realized as a plurality of OR gates 412 configured to bitwise-OR corresponding output bits from the read control circuitry 402 of each tag macro 301, 302, 303, 304 of the data management circuitry 300.

Figure 5:
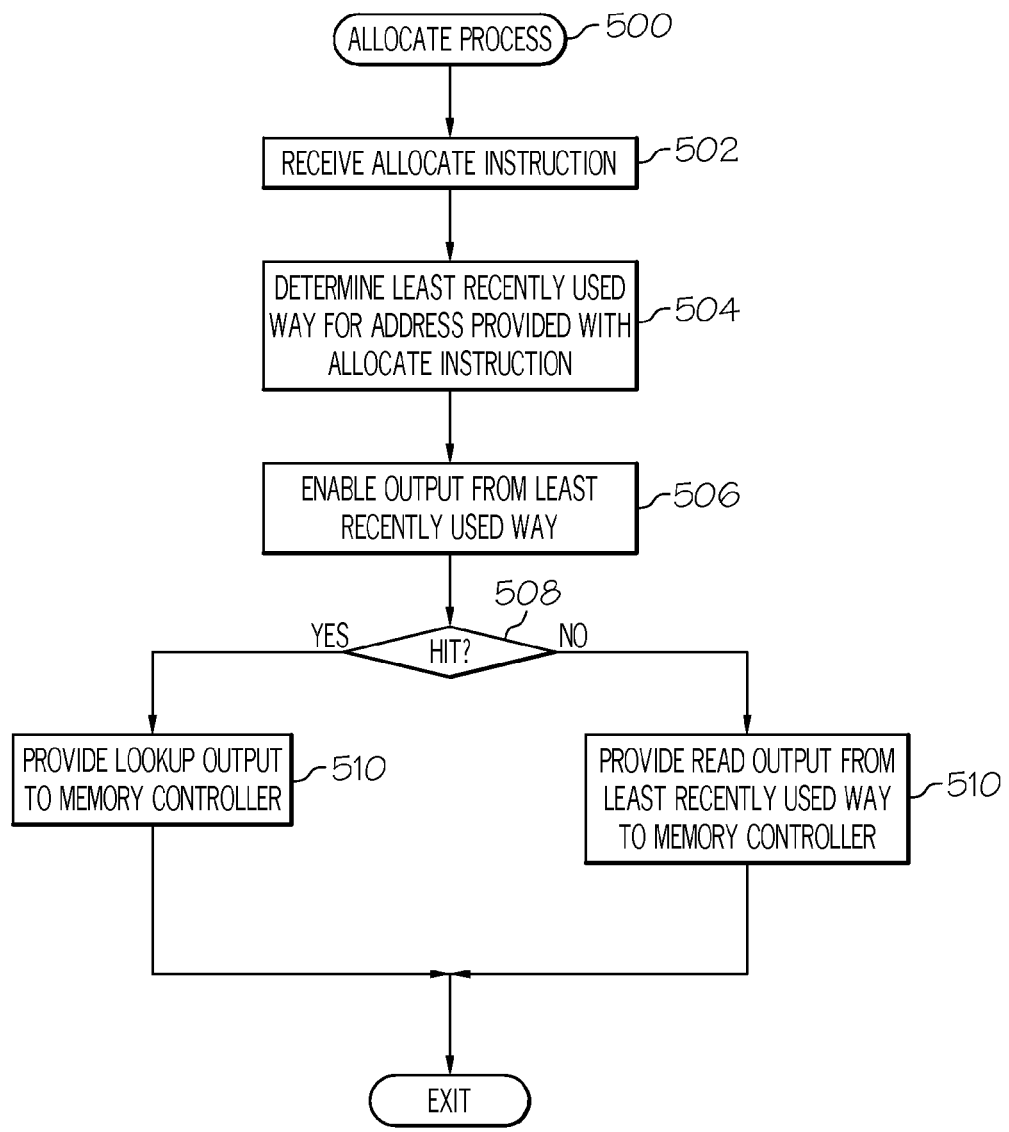
FIG. 5 is an allocate process suitable for use with the computing system of FIG. 1 in accordance with one or more embodiments.

Referring now to FIG. 5, in an exemplary embodiment, a computing module 106 may be configured to perform an allocate process 500 and additional tasks, functions, and/or operations as described below. The various tasks may be performed by software, hardware, firmware, or any combination thereof. For illustrative purposes, the following description may refer to elements mentioned above in connection with FIGS. 1-4. In practice, the tasks, functions, and operations may be performed by different elements of the described system, such as the memory controller 108, cache 110, 200, the data management circuitry 201, 300, the tag macros 301, 302, 303, 304, the replacement module 204, 306, the read output circuitry 308, the lookup output circuitry 310, the output selection circuitry 312, the ways 314, the control circuitry 316, the read circuitry 318, the lookup circuitry 320, and/or the LRU decoder 322. It should be appreciated any number of additional or alternative tasks may be included, and may be incorporated into a more comprehensive procedure or process having additional functionality not described in detail herein.

Referring to FIG. 5, and with continued reference to FIGS. 1-4, the allocate process 500 may be performed to enable a cache memory element, such as the L3 cache 110, 200 of computing module 106, to perform an allocate operation in response to a cache miss in a smaller cache memory element in the cache hierarchy (e.g., a miss in one of the L2 caches 112, 114, 116, 118). As described above, the allocate operation is a combined lookup operation and read operation, wherein if there is a hit in one of the tag macros 301, 302, 303, 304 of the L3 cache 110, 200 at the input address in one of the ways 314, the requested data corresponding to the input tag information may be read from the data macro 206, and in the absence of a hit, the stored tag information maintained at the input address by the way 314 to be replaced based on that address (e.g., the least recently used way for that address) is provided to the memory controller 108. In some embodiment, the stored tag information at the input address of the way to be replaced (e.g., the least recently used way) may be utilized by the memory controller 108 to replace the data corresponding to the stored tag information in the data macro 206 with the requested data obtained from a higher level memory (e.g., memory 104) in a conventional manner.

In an exemplary embodiment, the allocate process 500 begins by receiving an allocate instruction from the memory controller (task 502). In this regard, the memory controller 108 provides instructions or otherwise signals the tag block 202 and/or tag macros 301, 302, 303, 304 to perform a read operation and a lookup operation concurrently. Along with the concurrent read and lookup instruction signals, the memory controller 108 provides input tag information and an input address (e.g., a particular combination of rows and columns) for tag information maintained by each way 314 within the tag block 202 and/or tag macros 301, 302, 303, 304 to be compared to the input tag information. In response to the concurrent read and lookup instructions, each way 314 within each tag macro 301, 302, 303, 304 accesses or otherwise reads the data bits from the input address (e.g., the bits from the identified rows and columns) within the way 314 and provides the data bits corresponding to the tag information at the input address within the respective way 314 to the inputs of its read circuitry 318 and its lookup circuitry 320. The lookup instruction signals provided by the memory controller 108 enable or otherwise activate the lookup circuitry 320 of the ways 314 of the tag block 202. As described above, the lookup circuitry 320 of each way 314 compares the tag information maintained by the way 314 at the input address to the input tag information provided by the memory controller 108 to determine or otherwise identify if there is a match (or hit) within the cache 110, 200. In response to identifying the tag information maintained at the input address matches the input tag information, the lookup circuitry 320 of the matching way 314 provides the tag information at the input address to the control circuitry 316 of its respective tag macro 301, 302, 303, 304, which, in turn, provides the tag information from the input address of the matching way 314 to the lookup output circuitry 310. The lookup circuitry 320 of the matching way 314 also generates a logical high hit signal that is provided to the output selection circuitry 312 to provide the result of the lookup operation to the memory controller 108, as set forth above and described in greater detail below.

In an exemplary embodiment, the allocate process 500 continues by determining or otherwise identifying the way to be replaced based on the input address provided by the memory controller with the allocate instruction (task 504). In accordance with one or more embodiments, the allocate process 500 determines the least recently used way for the input address provided by the memory controller with the allocate instruction. In this regard, the LRU module 204, 306 and/or LRU decoder 322 receives the input address from the memory controller 108 and determines the least recently used way 314 based on the input address provided by the memory controller 108.

In response to determining the way to be replaced based on the addressing information (e.g., the least recently used way for the addressing information), the allocate process 500 continues by enabling the output of the read circuitry of the way to be replaced (task 506). In this regard, the LRU module 204, 306 and/or LRU decoder 322 asserts or otherwise provides a logical high way select signal to the read circuitry 318 of the least recently used way 314 (e.g., the inputs of AND gates 406) to enable, activate, or otherwise provide the data bits corresponding to the tag information at the input address in the least recently used way 314 from the read circuitry 318 to the read control circuitry 402 of the control circuitry 316. As set forth above, in an exemplary embodiment, the LRU decoder 322 generates a one-hot multi-bit way select signal, such that a logical low way select signal is provided to the read circuitry 318 (e.g., the inputs of AND gates 406) of the remaining ways 314 in the tag block 202 to disable or otherwise prevent the tag information at the input address of the other ways 314 from being provided to the read control circuitry 402 of the control circuitry 316 and/or read output circuitry 308. As described above, in response to the logical high way select signal to the inputs of AND gates 406, the read data bits for the indexed entry of the least recently used way 314 pass through the read circuitry 318 and to the inputs of the OR gates 408 of read control circuitry 402. When the flip-flops 410 are clocked, the data bits read from the input address of the least recently used way 314 are provided to the inputs of the output selection circuitry 312 corresponding to the result of the read operation by virtue of the logical OR operations performed by the control circuitry 316 (e.g., by OR gates 406) and the read output circuitry 308 (e.g., by OR gates 412).

In an exemplary embodiment, the allocate process 500 continues by determining or otherwise identifying whether there was a hit within the cache while performing the allocate operation, and in response to identifying a hit within the cache, providing the result of the lookup operation, that is, the tag information at the input address in the matching way, to the memory controller (tasks 508, 510). As described above, in response to a logical high hit signal, the output selection circuitry 312 is configured to provide the lookup output data bits from the lookup output circuitry 310 to the memory controller 108. In the absence of a hit within the cache, the allocate process 500 provides the result of the read operation, that is, the tag information at the input address in the way to be replaced for that input address (e.g., the least recently used way for that input address) to the memory controller (task 512). As described above, in response to a logical low hit signal, the output selection circuitry 312 is configured to provide the data bits corresponding to the tag information maintained at the input address in the least recently used way 314 from the read output circuitry 308 to the memory controller 108.

To briefly summarize, one advantage of the apparatus and methods described above is that the allocate operation may be performed in a single clock cycle with reduced power consumption. In this regard, by enabling/disabling the read output from within the individual ways, the number and distance of signal lines that toggle within the tag block are reduced, thereby reducing power consumption and reducing the likelihood of the signal lines from the ways other than the least recently used way interfering with other signals (e.g., routed above and/or below the read output signal lines from the ways).

For the sake of brevity, conventional techniques related to integrated circuit design, caching, memory operations, memory controllers, and other functional aspects of the systems (and the individual operating components of the systems) may not be described in detail herein. Physical embodiments of the subject matter described herein can be realized using existing semiconductor fabrication techniques and computer-implemented design tools. For example, hardware description language code, netlists, or the like may be utilized to generate layout data files, such as Graphic Database System data files (e.g., GDSII files), associated with various logic gates, standard cells and/or other circuitry suitable for performing the tasks, functions, or operations described herein. Such layout data files can be used to generate layout designs for the masks utilized by a fabrication facility, such as a foundry or semiconductor fabrication plant (or fab), to actually manufacture the devices, apparatus, and systems described above (e.g., by forming, placing and routing between the logic gates, standard cells and/or other circuitry configured to perform the tasks, functions, or operations described herein). In practice, the layout data files used in this context can be stored on, encoded on, or otherwise embodied by any suitable non-transitory computer readable medium as computer-executable instructions or data stored thereon that, when executed by a computer, processor, of the like, facilitate fabrication of the apparatus, systems, devices and/or circuitry described herein.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. As used herein, a "node" means any internal or external reference point, connection point, junction, signal line, conductive element, or the like, at which a given signal, logic level, voltage, data pattern, current, or quantity is present.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient and edifying road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A memory element comprising:
a plurality of way memory elements, each way memory element being configured to selectively output read data bits maintained at an input address; and
a replacement module coupled to the plurality of way memory elements, a first way memory element of the plurality of way memory elements to be replaced based on the input address, wherein the replacement module is configured to enable output of the read data bits from the first way memory element in response to an allocate instruction including the input address while disabling output of read data bits from remaining way memory elements of the plurality of way memory elements, the read data bits output from the first way memory element being maintained at the input address of the first way memory element.

2. A memory element comprising:
a plurality of way memory elements, each way memory element being configured to selectively output data bits maintained at an input address, each way memory element comprising a plurality of AND gates, each AND gate having a first input and a second input, the first input being configured to receive a respective data bit maintained at the input address within the respective way memory element; and
a replacement module coupled to the plurality of way memory elements, wherein the replacement module is configured to enable output of the data bits maintained at the input address of the first way memory element of the plurality of way memory elements for replacement in response to an allocate instruction including the input address by providing a logical high way memory element select signal to the second input of each AND gate of the first way memory element.

3. The memory element of claim 2, wherein in response to receiving the allocate instruction, each way memory element is configured to read the data bits maintained at the input address, resulting in the data bits maintained at the input address of the respective way memory element at the first inputs of the plurality of AND gates of the respective way memory element.

4. The memory element of claim 3, wherein:
the replacement module is configured to disable output of the data bits maintained at the input address of a second way memory element of the plurality of way memory elements; and
the second way memory element is not the first way memory element.

5. The memory element of claim 4, wherein the replacement module is configured to disable output of the data bits maintained at the input address of the second way memory element by providing a logical low way memory element select signal to the second input of each AND gate of the second way memory element.

6. The memory element of claim 3, the allocate instruction including input information, wherein each way memory element is configured to:
compare the data bits maintained at the input address within the respective way memory element to the input information; and
assert a hit signal when the data bits maintained at the input address matches the input information.

7. The memory element of claim 6, further comprising:
an output interface; and
output selection circuitry coupled to the plurality of way memory elements and the output interface, wherein the output selection circuitry is configured to provide the data bits maintained at the input address of the first way memory element to the output interface unless a hit signal is asserted by a second way memory element of the plurality of way memory elements.

8. The memory element of claim 7, wherein the output selection circuitry is configured to provide the data bits maintained at the input address of the second way memory element in response to the hit signal asserted by the second way memory element.

9. A computing module comprising:
a memory controller configured to provide an allocate instruction, the allocate instruction including an input address; and
a cache memory element coupled to the memory controller, the cache memory element including:
a first memory block configured to maintain data;
a second memory block including a plurality of way memory elements, each way memory element being configured to maintain tag information corresponding to the data maintained by the first memory block, wherein each way memory element is configured to selectively output the tag information maintained at the input address in response to the allocate instruction; and
a replacement module configured to enable output of the tag information from a first way memory element of the plurality of way memory elements while disabling output of tag information from remaining way memory elements of the plurality of way memory elements, the first way memory element to be replaced based on the input address.

10. The computing module of claim 9, the allocate instruction including input tag information, wherein the cache memory element is configured to provide the tag information maintained at the input address by the first way memory element to the memory controller when the tag information maintained at the input address by each way memory element of the plurality of way memory elements does not match the input tag information.

11. The computing module of claim 10, wherein in response to the tag information maintained at the input address by a second way memory element of the plurality of way memory elements matching the input tag information, the cache memory element is configured to provide the tag information maintained at the input address by the second way memory element to the memory controller in lieu of the tag information from the first way memory element.

12. The computing module of claim 9, wherein the replacement module is configured to identify the first way memory element by determining a least recently used way memory element of the plurality of way memory elements based on the input address.

13. The computing module of claim 12, each way memory element of the plurality of way memory elements including read circuitry configured to selectively output the tag information maintained at the input address by the respective way memory element, wherein the replacement module is configured to enable output of the read circuitry of the first way memory element in response to the allocate instruction.

14. The computing module of claim 13, the read circuitry comprising a plurality of AND gates, each AND gate having a first input and a second input, the first input being configured to receive a respective data bit of the tag information maintained at the input address within the respective way memory element, wherein the replacement module is configured to enable output of the read circuitry of the first way memory element by providing a logical high signal to the second input of each AND gate of the first way memory element.

15. The computing module of claim 14, wherein the second memory block includes control circuitry configured to bitwise-OR outputs of the read circuitry of the plurality of way memory elements.

16. A method for operating a memory element comprising a plurality of way memory elements, the method comprising:
receiving an allocate instruction, the allocate instruction including an input address; and
in response to the allocate instruction, enabling a read output of a first way memory element of the plurality of way memory elements for that input address while disabling read outputs of remaining way memory elements of the plurality of way memory elements, the read output of the first way memory element corresponding to information maintained at the input address by the first way memory element, the first way memory element to be replaced for that input address.

17. The method of claim 16, wherein enabling the read output of the first way memory element further comprises generating a one-hot multi-bit way memory element select signal, wherein a bit of the one-hot multi-bit way memory element select signal corresponding to the first way memory element is a logical high value.

18. The method of claim 17, further comprising determining the first way memory element corresponds to a least recently used way memory element of the plurality of way memory elements for the input address, the first way memory element including a plurality of AND gates, the output of the plurality of AND gates corresponding to the read output of the first way memory element, each AND gate having a first input and a second input, the first input being configured to receive a respective data bit of the information maintained at the input address by the first way memory element, wherein enabling the read output of the first way memory element comprises providing the bit of the one-hot multi-bit way memory element select signal corresponding to the first way memory element to the second input of each AND gate.

19. The method of claim 16, the first way memory element including a plurality of AND gates, the output of the plurality of AND gates corresponding to the read output of the first way memory element, each AND gate having a first input and a second input, the first input being configured to receive a respective data bit of the information maintained at the input address by the first way memory element, wherein enabling the read output of the first way memory element comprises providing an asserted signal to the second input of each AND gate.

* * * * *